United States Patent [19]
Sheehy et al.

[11] Patent Number: 5,118,051
[45] Date of Patent: Jun. 2, 1992

[54] ROLL VIBRATION ABSORBER

[75] Inventors: Thomas W. Sheehy, Hamden; David S. Jenney, Stratford; Phillip Mordaunt, Milford, all of Conn.

[73] Assignee: United Technologies Corporation, Hartford, Conn.

[21] Appl. No.: 339,578

[22] Filed: Apr. 18, 1989

[51] Int. Cl.⁵ .............................................. B64C 27/00
[52] U.S. Cl. ............................... 244/17.11; 244/17.27; 188/379
[58] Field of Search ..................... 244/17.27, 17.11, 93; 188/379, 380

[56] References Cited

U.S. PATENT DOCUMENTS

| | | | |
|---|---|---|---|
| 1,638,782 | 8/1927 | Paton | 188/380 |
| 3,514,054 | 5/1970 | Mard et al. | 244/17.27 |
| 4,042,070 | 8/1977 | Flannelly | 244/17.27 |
| 4,230,291 | 10/1980 | Marshall, II | 244/17.11 |
| 4,311,213 | 1/1982 | Desjardins et al. | 244/17.27 |
| 4,403,681 | 9/1983 | Desjardins | 188/379 |
| 4,458,861 | 7/1984 | Mouille | 244/17.27 |
| 4,619,349 | 10/1986 | Braun | 188/380 |
| 4,736,701 | 4/1988 | Koudo et al. | 188/380 |
| 4,852,848 | 8/1989 | Kucera | 188/380 |

FOREIGN PATENT DOCUMENTS 1104323  7/1984  U.S.S.R. .............................. 188/380

Primary Examiner—Joseph F. Peters, Jr.
Assistant Examiner—Christopher P. Ellis
Attorney, Agent, or Firm—Edward L. Kockey, Jr.

[57] ABSTRACT

A helicopter (10) is roll vibration resistant having cantilever spring (40) supported masses (42) located at extreme outboard locations (30). The spring portion (40) extends substantially horizontally and is rigidly secured to rigid structure (28). This vibration absorber (34) is tuned to the forced frequency established by the normal rotor (14) RPM times the number of rotor blades (16).

15 Claims, 2 Drawing Sheets

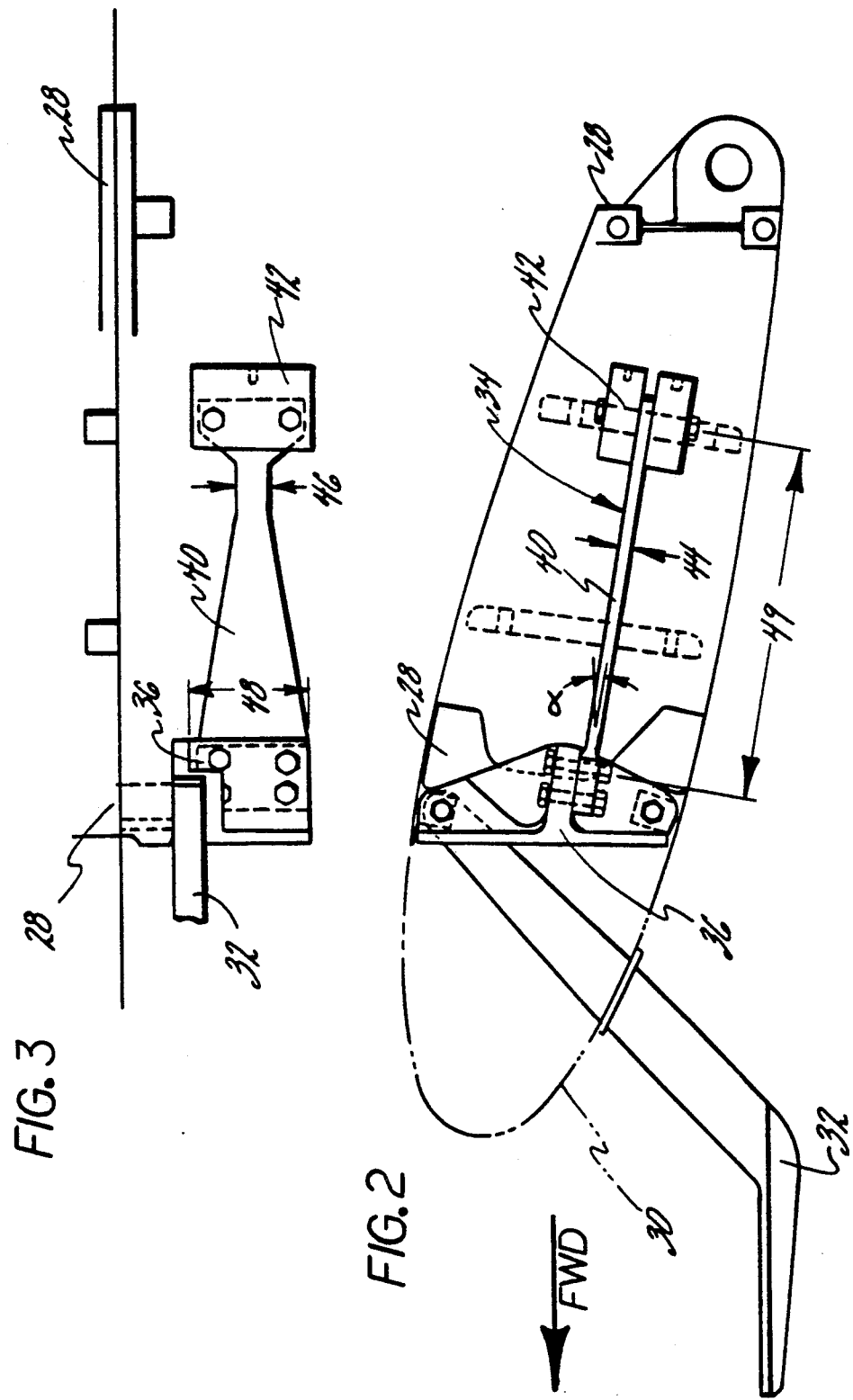

ROLL VIBRATION ABSORBER

DESCRIPTION

1. Technical Field

The invention relates to helicopter construction and in particular to reducing roll vibration at the normal operating condition.

2. Background Art

During normal operation helicopters operate with the blades rotating at a constant RPM. A forcing frequency of the number of blades times the RPM is imposed primarily at the rotor hub. This imposes vibration throughout the fuselage structure with the resultant vibration at the pilot and copilot positions being of primary concern.

Because of the complex structure of the fuselage various portions of the structure may absorb or exacerbate the vibrations at various frequencies. Modifications to an original design can also have substantial effects by changing these natural frequencies. Also variations in fuel loading or other components added to the fuselage may change the resultant vibrations as sensed at the pilot and copilot locations in particular.

It has been known that placing vertical vibration absorbers in the nose or the cabin is effective for the purpose of absorbing and thereby minimizing sensed vibrations. Even these vibration absorbers when tuned to the critical frequency on a bench sometimes require retuning after installation. It is believed that such problems have been caused by the sensitivity of the absorber design to variation in installation, in flight deformation of the support structure, and friction in the bearings used in some of these absorbers.

Despite the installation of these absorbers, and the inclusion of horizontal freedom in the absorbers it has been found that a vibration in the roll direction continues to exist without being significantly reduced.

DISCLOSURE OF INVENTION

It is an object of the invention to reduce the vibration by absorbing a portion thereof at the frequency imposed by the rotor during the normal operating condition.

It is a further object to absorb vertical vibrations simultaneously where a combination of in-phase vertical and roll vibrations exists.

On a fuselage having thereon a multibladed rotor, two vertical vibration absorbers are located, one on each side. Each vibration absorber has a resiliently supported mass which is rigidly connected to one end of a cantilever spring. The other end of the cantilever spring is rigidly connected to the fuselage with the mass being located at an extreme outboard location.

A cantilever spring portion extends substantially horizontally providing a substantial vertical component of the vibration resisting forces. The absorber is preferably secured to a rigid structure extending outboard in the area of the cabin. There is very little change between the tuned frequency on a workbench and the installed frequency since there are no moving or sliding portions within the vibration absorber, and the rigidity of the structure to which it is connected does not substantially modify this frequency.

BRIEF DESCRIPTION OF THE DRAWINGS

FIG. 2 is a side elevation of the vibration absorber installed in the stub wing.

FIG. 3 is a plan view of the installed vibration absorber.

DESCRIPTION OF THE PREFERRED EMBODIMENT

Figure 1:
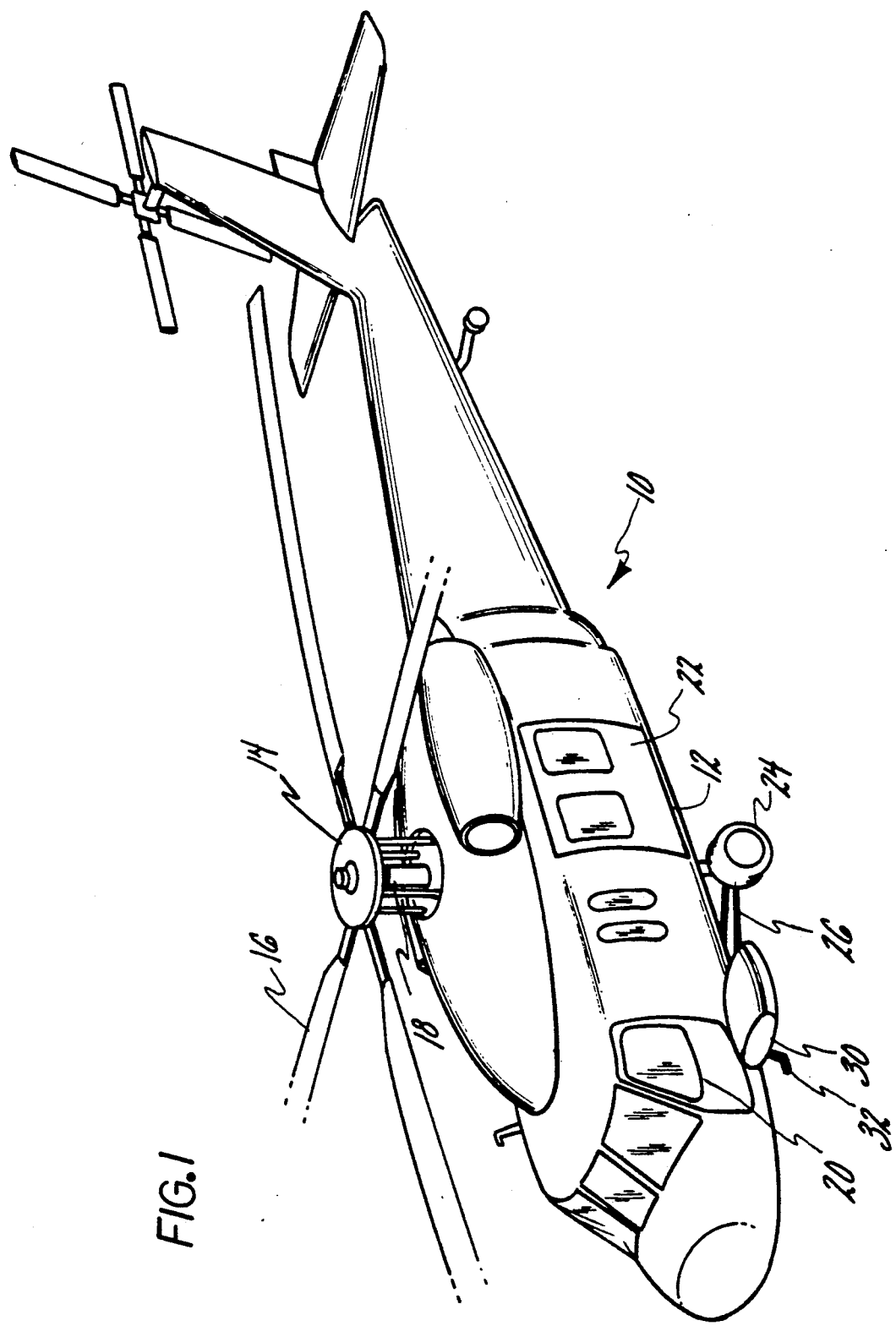
FIG. 1 is an overall view of the helicopter.

Helicopter 10 includes a fuselage 12 and a rotor 14 having four blades 16. Rotation of this rotor at the normal operating speed of 258 RPM imposes a force at a forcing frequency of 17.2 Hertz through rotor hub 18. This force causes vibration throughout the fuselage being sensed in cockpit 20 where the pilot and copilot are seated. Conventional absorbers are located inside an overhead cabin 22.

In the conventional design helicopter wheels 24 are secured by drag strut 26 to a framework 28 within stub wing 30. This framework 28 is a rigid structure secured to the fuselage as required for the dynamic forces imposed by certain landing conditions. It can also be seen that the stub wing has an aerodynamic fairing to reduce air drag forces.

In some designs the structure also carries step 32 and therefore has pre-existing bolt holes located therein.

On each of the lefthand and righthand side of the fuselage the vertical vibration absorber 34 is located. An aluminum bracket 36 is bolted to the rigid outboard extension 28 of the fuselage and is rigidly connected to cantilever spring portion 40 of the vibration absorber.

Rigidly secured to the other end of the cantilever spring portion is a mass member 42 located in a environment permitting vertical movement. The mass member 42 is located at an extreme outboard position. The support bracket 32 may also be located at an extreme outboard location as illustrated here, although that is not critical.

The cantilever spring portion is ideally horizontal although as indicated in FIG. 2, where alpha is fifteen degrees some variation from this is permissible, with the angle preferably being between 0 and 20 degrees.

It is also noted that the thickness 44 of the cantilever spring portion is 0.86 centimeters while its minimum width 46 is 2.5 centimeters and its maximum width 48 is 8.9 centimeters. Mass 42 is 4.1 Kg and is located with length 49 between the support and the center of gravity of the mass. A resulting natural frequency of 17.1 hertz was calculated.

Accordingly the vibration absorber is well adapted to absorb vertical vibrations while resisting any tendency of the absorber to interfere with the vertical movement because of horizontal vibrations. It is also noted that each of the connections is rigid, with no sliding friction and no bearings, whereby variations in installation procedures will not affect the natural frequency. Furthermore this is connected to a rigid structure which in itself will deflect little thereby avoiding any significant change in the natural frequency of the installed structure.

These vibration absorbers were installed for test purposes on a helicopter having a delivery gross weight of 6100 kilograms and a take-off weight in the order of 7600 kilograms. Each absorber weighed a total of 7.7 kilograms with 4.1 kilograms of this being in the mass. The total weight of the absorber included the spring, the brackets, and additional fairings.

In the absence of the vibration absorbers it has been found that the prior art vibration absorbers located in the cabin have been satisfactory in absorbing the vertical components of the vibration. It has however been noted that recent modifications of some aircraft have increased roll vibrations to significant levels. In this situation the upward movement of the copilot seat occurs simultaneously with the downward movement of the pilot seat.

In the tested helicopter it was noted that with the conventional absorbers installed but without the roll vibration absorbers of this invention installed peak velocities at these seat locations occurred of 0.5 centimeters per second at 80 knots, 0.46 centimeters per second at 120 knots, 1.5 centimeters per second at 140 knots, and 0.96 centimeters per second at 155 knots. With the absorbers installed the corresponding accelerations were reduced to 0.1, 0.25, 0.15 and 0.1 centimeters per second.

These vibration absorbers are ideally situated to reduce roll vibration at the 17.2 Hertz frequency. It is noted however that even without roll, should there be a vertical vibration at the same frequency they will operate to absorb a portion of that vibration. Furthermore with any combination of vertical vibration and roll vibration the absorber on each side will operate to provide the optimum restraint to the combination of vibrations.

For instance in the unusual situation where vertical and roll vibration were combined such that there was no vertical movement at one absorber and substantial vertical movement at the other, the one absorber would remain inactive while the other would be operative at a high level. All other combinations would also tend to produce the optimum result.

The cantilever spring portion of each absorber is preferably formed of titanium which has an elastic modulus about half of that of steel. For a constant stiffness this results in a slightly thicker spring than steel. At a given amplitude the thicker spring will have slightly higher strains but, because of the lower modulus, lower stresses. Tests with the titanium spring for the installed design show stress levels that should result in an infinite life for the absorber.

The complete stub wing absorber installation weighs only 15.2 kilograms, being effective because of its extreme outboard location. An extended fairing may be placed around the absorber which is itself extremely compact and unobtrusive. The drag impact is negligible.

This stub wing vibration absorber can easily be retrofitted to existing helicopters. It can also be reliably pretuned, all absorbers tested have worked properly without requiring tuning adjustments after installation.

We claim:
1. A roll vibration resistant helicopter comprising:
   a fuselage having a righthand side and a lefthand side;
   a multibladed rotor having n blades and normally operating at a fixed RPM;
   two vertical vibration absorbers, each having a resiliently supported mass;
   each vibration absorber located with the mass at a substantially extreme outboard location on said fuselage, one on the righthand side and one on the lefthand side, each of said vibration absorbers having only one element fixedly secured to any structure outside the vibration absorber,; and
   each of said vibration absorbers tuned to a frequency of n times RPM.
2. A roll vibration resistant helicopter as in claim 1:
   each vibration absorber comprising a cantilever spring portion, said mass rigidly secured to one end of said spring portion, and the other end of said spring portion rigidly secured to said fuselage
3. A roll vibration resistant helicopter as in claim 2:
   said spring portion extending substantially horizontally.
4. A roll vibration resistant helicopter as in claim 3;
   said spring portion extending between zero and 20 degrees from the horizontal.
5. A roll vibration resistant helicopter as in claim 2;
   said fuselage having a rigid structure extending outwardly;
   said vibration absorber secured to said rigid structure.
6. A roll vibration resistant helicopter as in claim 5:
   said fuselage having a cabin at a forward location;
   said vibration absorber located at said forward location.
7. A roll vibration resistant helicopter as in claim 2:
   said cantilever spring portion formed of titanium.
8. A roll vibration resistant helicopter as in claim 2:
   said fuselage having also a stub wing and wheel drag struts secured to said stub wing; said vibration absorber located on said stub wing.
9. A roll vibration resistant helicopter as in claim 8:
   said vibration absorber bolted to the outboard end of said stub wing.
10. A roll vibration resistant helicopter as in claim 2:
    said cantilever spring portion being flexible in the vertical direction, but stiff in the horizontal direction.
11. A roll vibration resistant helicopter as in claim 3;
    said fuselage having a rigid structure extending outwardly;
    said vibration absorber secured to said rigid structure.
12. A roll vibration resistant helicopter as in claim 11:
    said cantilever spring portion formed of titanium.
13. A roll vibration resistant helicopter as in claim 12:
    said fuselage having a cabin at a forward location;
    said vibration absorber located at said forward location.
14. A roll vibration resistant helicopter as in claim 13:
    said cantilever spring portion being flexible in the vertical direction, but stiff in the horizontal direction.
15. A roll vibration resistant helicopter comprising:
    a fuselage having a righthand side and a lefthand side;
    a multibladed rotor having n blades and normally operating at a fixed RPM;
    two vertical vibration absorbers, each having a resiliently supported mass;
    each vibration absorber located with the mass at a substantially extreme outboard location on said fuselage, one on the righthand side and one on the lefthand side, each of said vibration absorbers having only one element thereof secured to said fuselage; and
    each of said vibration absorbers tuned to a frequency of n times RPM.

* * * * *